United States Patent
Yano et al.

(10) Patent No.: US 9,537,150 B2
(45) Date of Patent: Jan. 3, 2017

(54) ELECTRODE FOR SECONDARY BATTERY AND PRODUCTION PROCESS FOR THE SAME AND SECONDARY BATTERY

(75) Inventors: Tsuyoshi Yano, Toyota (JP); Tetsuhiro Ishikawa, Toyota (JP); Shinji Saito, Tsu (JP); Takehiko Sawai, Tsu (JP)

(73) Assignees: Toyota Jidosha Kabushiki Kaisha, Toyota-shi, Aichi-ken (JP); SEI Corporation, Tsu-shi, Mie-ken (JP)

( * ) Notice: Subject to any disclaimer, the term of this patent is extended or adjusted under 35 U.S.C. 154(b) by 808 days.

(21) Appl. No.: 12/597,513

(22) PCT Filed: Apr. 24, 2008

(86) PCT No.: PCT/JP2008/057954
§ 371 (c)(1),
(2), (4) Date: Oct. 26, 2009

(87) PCT Pub. No.: WO2008/136361
PCT Pub. Date: Nov. 13, 2008

(65) Prior Publication Data
US 2010/0119949 A1 May 13, 2010

(30) Foreign Application Priority Data

Apr. 27, 2007 (JP) ................................ 2007-119427

(51) Int. Cl.
*H01M 4/62* (2006.01)
*H01M 4/88* (2006.01)
(Continued)

(52) U.S. Cl.
CPC .............. *H01M 4/625* (2013.01); *H01M 4/13* (2013.01); *H01M 4/139* (2013.01); *H01M 4/02* (2013.01);
(Continued)

(58) Field of Classification Search
CPC ............ H01M 4/02; H01M 4/08; H01M 4/62; H01M 4/88
(Continued)

(56) References Cited

U.S. PATENT DOCUMENTS

2010/0261061 A1  10/2010  Yuasa et al.

FOREIGN PATENT DOCUMENTS

| CN | 1889290 | 1/2007 |
|----|---------|--------|
| JP | 10-158005 | 6/1998 |

(Continued)

OTHER PUBLICATIONS

Text of First Office Action for Chinese Appl. No. 200880013909.3 dated Oct. 21, 2011.
(Continued)

*Primary Examiner* — Karie O'Neill Apicella
(74) *Attorney, Agent, or Firm* — Finnegan, Henderson, Farabow, Garrett & Dunner, LLP (57) ABSTRACT

To provide an electrode for secondary battery, electrode which can materialize secondary batteries that are adapted into producing high output and additionally whose durability is high.
It is characterized in possessing an electrode material that has an active-material powder 11, a conductive material 12 being formed of a carbonaceous material, and being adhered to a surface of said active-material powder 11, and fibrous conductive materials 13 being bonded to said conductive material 12. First of all, it becomes feasible to maintain the electric connection between the active-material powder and the conductive material stably by adhering the conductive material to a surface of the active-material powder. Further, the fibrous conductive materials are bonded to the conductive material that is adhered to a surface of the active-material powder. It is feasible to maintain the electric
(Continued)

connection by getting the fibrous conductive materials entangled to each other. That is, it is feasible to keep the electric connection even when strains occur in the electrode material, because the fibrous conductive materials absorb the strains to keep the mutual contacts; even if large strains occur, it is possible to maintain the electric connection, because it is not disconnected compared with that in conventional conductive materials.

14 Claims, 1 Drawing Sheet

(51) Int. Cl.
    *H01M 4/13*       (2010.01)
    *H01M 4/139*     (2010.01)
    *H01M 4/02*       (2006.01)
    *H01M 10/052*   (2010.01)

(52) U.S. Cl.
    CPC ........... *H01M 10/052* (2013.01); *Y02E 60/122* (2013.01); *Y02P 70/54* (2015.11)

(58) Field of Classification Search
    USPC ....................................................... 429/232
    See application file for complete search history.

(56) References Cited

FOREIGN PATENT DOCUMENTS

| | | | | |
|---|---|---|---|---|
| JP | 10-236808 | | 9/1998 | |
| JP | 10-236809 | | 9/1998 | |
| JP | 2001-89118 | | 4/2001 | |
| JP | 2001-126733 | | 5/2001 | |
| JP | 2001126733 A | * | 5/2001 | ............. H01M 4/62 |
| JP | 2003-059491 | | 2/2003 | |
| JP | 2003-168429 | | 6/2003 | |
| JP | 2004-186075 | | 7/2004 | |
| JP | 2005-19399 | * | 1/2005 | |
| JP | 2006-8462 | | 1/2006 | |
| JP | 2006-77214 | | 3/2006 | |
| JP | 2006077214 A | * | 3/2006 | ............. C08L 61/06 |
| JP | 2006-244984 | | 9/2006 | |
| JP | 3867030 | | 10/2006 | |
| JP | 2007-048692 | | 2/2007 | |
| JP | 2007-242386 | | 9/2007 | |

OTHER PUBLICATIONS

Reasons for Refusal for JP Appl. No. 2007-119427 dated Nov. 17, 2011.
Machine translation of JP2005-019399A dated Jan. 20, 2005.
Machine translation of JP2004-186075A dated Jul. 2, 2004.
Machine translation of JP2001-126733A dated May 11, 2001.

* cited by examiner

ELECTRODE FOR SECONDARY BATTERY AND PRODUCTION PROCESS FOR THE SAME AND SECONDARY BATTERY

CROSS-REFERENCE TO RELATED APPLICATIONS

This application is a national phase application of International Application No. PCT/JP2008/057954, filed Apr. 24, 2008, and claims the priority of Japanese Application No. 2007-119427, filed Apr. 27, 2007, the contents of both of which are incorporated herein by reference.

TECHNICAL FIELD

The present invention relates to an electrode for secondary battery and a production process for the same, and a secondary battery.

BACKGROUND ART

In recent years, making the capacity of secondary batteries, such as lithium secondary batteries, much higher has been sought. For the purpose of materializing making the capacity of lithium secondary batteries higher, the following have been investigated and proposed: improving active materials that are used for the electrodes of lithium secondary batteries; filling those active materials up with high densities; increasing the areas of electrodes; or making members that do not contribute to battery reactions smaller, such as turning separators into thin films. For example, techniques that prescribe positive-electrode particulate diameters, pore volumes or specific surface areas have been proposed (Patent Literature Nos. 1-4, and the like).

However, it is difficult to say that the means that have been proposed so far, including Patent Literature Nos. 1-4, are effective to batteries for applications that require the voltage flatness at the time of charging/discharging and the output improvement, and furthermore retaining the cyclic durability while maintaining these properties (the durability for 10 years or more, for instance), though they are effective from the viewpoint of capacity enlargement.

For example, as one of the reasons that it is difficult to expand lithium secondary batteries to the applications of electric tools and hybrid cars in which large-current charge/discharge is needed, it is possible to name their durability under service conditions entailing large-current discharge is not sufficient, compared with that of nicad batteries and nickel-hydrogen batteries.

For the purpose of solving this durability, maintaining the conductivity between positive- and/or negative-electrode active-material particles, and the conductivity between those active materials and electricity collectors have been investigated. For example, in a secondary battery whose battery life is 2-4 years approximately but is practical enough for the applications to cellular phones and notebook-size personal computers, it has been proposed to add and then mix at least one of carbonaceous mesophase spherule and vapor-phase-growth carbon fibers as a conductive material at an electrode mixture-material layer in the negative electrode, for the purpose of improving the capacity and battery life and securing their safety (Patent Literature No. 5). However, it is not guaranteed that the low-resistance conductive material is dispersed homogenously within the electrode by simply adding it, and therefore it has become a cause of the occurrence of characteristic fluctuations between cells.

Here, in most cases of the aforementioned applications, multi cells are connected in series and are then used under high voltages, the properties, such as the capacities, outputs and resistances, fluctuate due to the degradation of the respective batteries (or cells) so that the performance lowering and drawbacks of power source itself have come to be brought about, and thereby even a drawback that occurs in a single battery has come to have a great influence on the entire power source.

Patent Literature No. 1: Japanese Unexamined Patent Publication (KOKAI) Gazette No. 10-158,005;
Patent Literature No. 2: Japanese Unexamined Patent Publication (KOKAI) Gazette No. 10-236,808;
Patent Literature No. 3: Japanese Unexamined Patent Publication (KOKAI) Gazette No. 10-236,809;
Patent Literature No. 4: Japanese Unexamined Patent Publication (KOKAI) Gazette No. 2001-89,118;
Patent Literature No. 5: Japanese Patent Gazette No. 3,867,030; and
Patent Literature No. 6: Japanese Unexamined Patent Publication (KOKAI) Gazette No. 2006-244,984

DISCLOSURE OF THE INVENTION

Assignment to be Solved by the Invention

By the way, the lowering of conductivity within electrode seems to be a major cause of lowering battery performance. One that takes on the conductivity within electrode is a conductive material that is mixed together with active materials in positive and negative electrodes. Being mixed and dispersed uniformly, the active materials, and the conductive material form conductive networks.

As one of the causes of no sufficient durability being obtainable in the case of applying large-current loads to use, the occurrence of cracks at electrode mixture-material layers in positive and negative electrodes can be named, because the electrode mixture-material layers repeat expansion and contraction on the occasion when repeating charge and discharge with large currents. When cracks occur at the electrode mixture-material layers, the conductivity between active-material particles, and the conductivity between them and electricity collectors have lost so that resistances become large; as a result, they have come to be unable to flow large current as battery, or capacities lower to reach their longevities at an early stage.

Therefore, in order to improve the durability of batteries, it is important to maintain conductive networks that are formed of active materials and conductive materials, in addition to forming such conductive networks uniformly.

As for a conventional technology for materializing this, a proposal on conductive material has been made (Patent Literature No. 6). Specifically, it proposes not only to simply mix a conductive material but also to bond a metallic catalyst to an active material's surface and then use carbon nanofibers, which are grown from that metallic catalyst, as another conductive material.

However, with regard to the growth of the carbon nanofibers on the metallic catalyst, the control of the fibrous diameters and lengths is difficult so that homogenous conductive materials are less likely to obtain; moreover, as for a method of carrying out the growth of carbon nanofibers, a method with low productivity, such as CVD, cannot help being employed so that it is unsuitable to apply it for applications, which require mass production, such as materials for battery; and, above all, it seems that the carbon nanofibers, which have grown on the metallic-catalyst particles, do not make any firm bond to the metallic particles but adhere onto the metallic catalyst with van der Waals force. Therefore, it seems to be insufficient as a means for solving the conductivity maintenance over a long period of time.

The present invention is one which has been completed in view of the aforementioned circumstances, and it is an assignment to be solved to provide a secondary battery which is adapted into producing high output and additionally whose durability is high, and to provide an electrode for secondary battery, electrode which can materialize such a secondary battery, and a production process for the same.

MEANS FOR SOLVING THE ASSIGNMENT

The present inventors carried out studies wholeheartedly for the purpose of solving the aforementioned assignment, and completed the following invention. Specifically, an electrode for secondary battery according to the present invention, which solves the aforementioned assignment, is characterized in that it is an electrode for positive electrode, and it possesses an electrode material having:
  an active-material powder for positive electrode;
  a conductive material being formed of a carbonaceous material, and being adhered to a surface of said active-material powder; and
  fibrous conductive materials being bonded to said active-material powder and said conductive material.

First of all, since the conductive material is adhered to a surface of the active-material powder, it becomes feasible to maintain the electric connection between the active-material powder and the conductive material stably. Further, the high-output characteristic and durability are made compatible by bonding ,he fibrous conductive materials to a surface of the active-material powder. Since the fibrous conductive materials get entangled to each other, it is feasible to maintain the electric connection.

Because the fibrous conductive materials have a construction in which they get entangled to each other to materialize the electric connection, they flex themselves to absorb applied strains so that it is possible to relief stresses. That is, even when strains occur in the electrode material, the fibrous conductive materials absorb the strains to keep the mutual contacts so that it is feasible to keep the electric connection; even if large strains occur, the electric connection is not disconnected, compared with that in conventional conductive materials, so that it is possible to maintain it; accordingly, it is possible to suppress the increase of internal resistance, which results from the disconnection of the electric connection, and the isolation of the active-material powder; and consequently the output lowering and capacity decrement are less likely to occur so that high durability can be materialized. Moreover, since many entanglements are generated in between the fibrous conductive materials, a high-output characteristic can be materialized.

Figure 1:
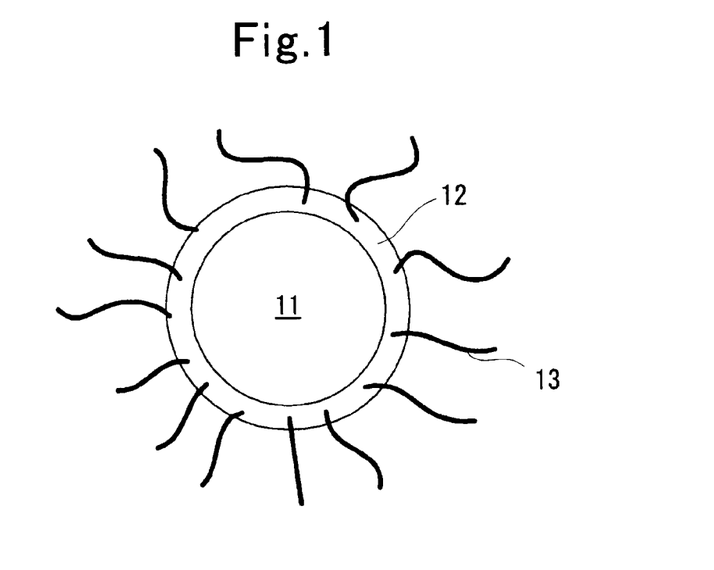
FIG. 1 is a conceptual diagram for illustrating an active-material powder that is contained in an electrode for secondary battery according to the present invention, and an appearance of its periphery.

Hereinafter, explanations are carried out using conceptual diagrams. When observing an electrode material for lithium secondary battery according to the present invention while focusing attention on a single active-material powder that is included in it, it is constituted of an active-material powder 11, a conductive material 12 that is adhered to its periphery, and fibrous conductive materials 13 that are bonded to the conducive material 12, as illustrated in FIG. 1.

Figure 2:
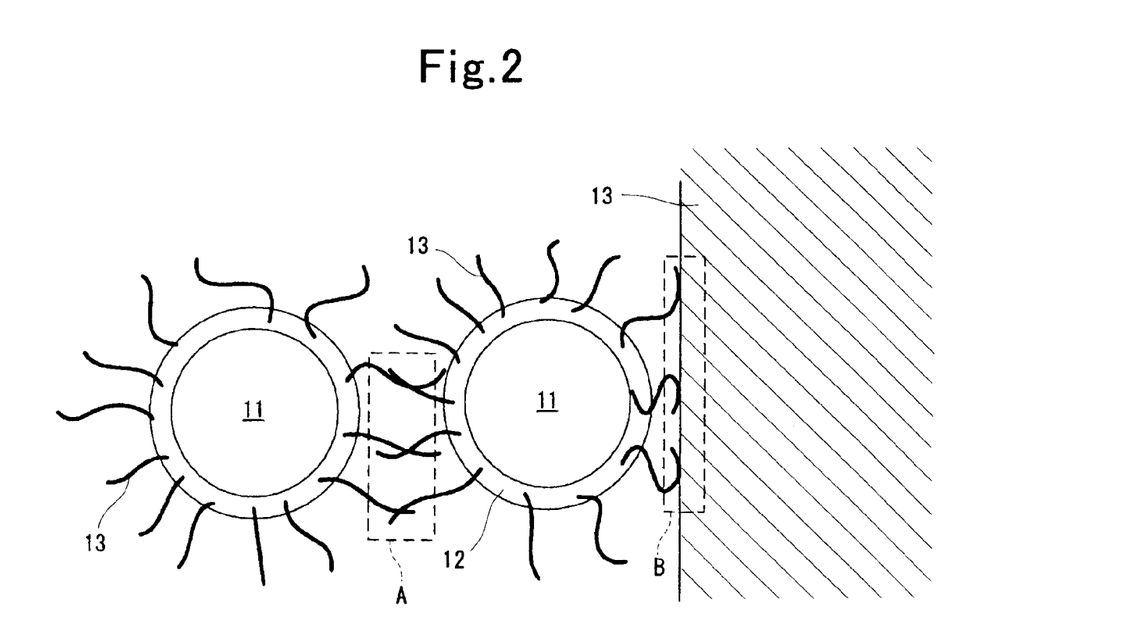
FIG. 2 is a conceptual diagram for illustrating active-material powders that are contained in an electrode for secondary battery according to the present invention, and an appearance of their peripheries.

When two or more active-material powders 11 exist in or within the electrode material that has such a construction, it is possible to materialize electric connections between the two active-material powders 11, and between one of the active-material powders 11 and an electricity collector 13 because the fibrous conductive materials 13, which the respective active-material powders 11 have, contact or get entangled to each other at an intervening space (A) (FIG. 2). These electric connections, which result from the entanglements of the fibrous conductive materials 13, are capable of coping flexibly with stresses, and thereby it is possible to keep the electric connections continuously under various conditions. For example, even if the distance between the two active-material powders in FIG. 2 separates or gets closer by means of stresses from the outside, since the entangled positions between the fibrous conductive materials can be displaced, no stress is applied between the active-material powder and the conductive material, or at the intervening space (B) between a conducting material and the fibrous conductive materials, so that it is possible to keep conductivity. Note that it is needless to say that it is possible to materialize an electric connection due to the contact between the conductive materials 12 in the same manner as conventional electrodes.

Here, in the present specification, the "adhesion" in between the active-material powder and the conductive material is a concept that involves the following: not to speak of a case where a covalent bond occurs between a surface of the active-material powder and the conductive material; and one in which a configuration of the conductive material turns into a configuration that follows a superficial configuration of the active-material powder to which it adheres at molecular level so that they stick to each other closely, and thereby they are bonded to each other by means of van der Waals force, as well as being bonded to each other mechanically by the conductive material that fits into an irregularity in a surface of the active-material powder. Even in one which results from the van der Waals force, it is possible to materialize a firm bond because the contacting area is great. Moreover, it is a concept that also involves such a case where atoms diffuse after being stuck to each other closely at molecular level. Further, it also involves a case where the conductive material coats around the active-material powder. For example, even if no firm bond that results from a covalent bond arises between the conductive material and the active-material powder, in a where the conductive material integrates the active-material powder so as to coat around the active-material powder, it is possible to materialize sufficient conductivity because it becomes feasible to keep the contact between the conductive material and the active-material powder even when no covalent bond arises between both of them.

And, in the present specification, the "bond" in between the conductive material and the fibrous conductive materials is a concept that involves the following: not to speak of a case where a covalent bond occurs between the conductive material and the fibrous conductive materials; and also one in which the conductive material and the fibrous conductive materials are stuck to each other closely at molecular level, and thereby they are bonded to each other firmly by means of van der Waals force. Moreover, it is a concept that involves such a case where atoms diffuse after being stuck to each other closely at molecular level. In the "bond," a case where a part of the fibrous conductive materials are buried in the conductive member so that van der Waals force or a covalent bond, or the like, occurs at that part is also involved, in addition to a case where the fibrous conductive materials contact with the conductive member.

And, it is desirable that said conductive material can be at least one that is selected from the group consisting of amorphous carbonaceous materials, turbostratic carbonaceous materials and activated carbon. Since the conductive material adheres onto a surface of the active-material powder, it is also possible to modify the surface of the active-material powder. The storage and release of lithium ions are done in the active-material powder of the electrode for lithium secondary battery; however, since the electron donating/accepting reaction becomes the rate-determining reaction in a case where large currents are flowed in the charge/discharge reaction of lithium ions, films, such as lithium- ion polymer membranes and metallic lithium films that become resistance, generate at interfaces as being accompanied by the storage and release of lithium ions, and accordingly they become a cause of the internal-resistance rise. Hence, it is possible to improve the output characteristic of eventual secondary battery by adhering the active material that comprises an amorphous carbonaceous material, turbostratic carbonaceous material or activated carbon, whose crystalline structure has disturbed parts in which taking lithium ions in and emitting them out proceed readily, onto a surface of the active-material powder, because it becomes possible to let the donating and accepting of lithium ions proceed smoothly, in the case of flowing large currents, correspondingly to the electron donating/accepting reaction by means of a cluster structure that the conductive material possesses so that the above-described films become less likely to generate at interfaces. Moreover, in electric double-layer capacitors, since the capacity and output characteristic of battery are improved by enlarging the specific surface area of electrode materials, it is desirable to adhere an amorphous carbonaceous material, turbostratic carbonaceous material or activated carbon, which makes it possible to increase specific surface area, onto a surface of the active-material powder.

Moreover, it is desirable that at least a part of said fibrous conductive materials can have a construction in which they are bonded to a plurality of said conductive materials. It is possible to keep the electric connection more securely by employing the construction that makes the fibrous conductive materials bond to a plurality of the conductive materials, in addition to materializing the electric connection between the conductive materials by means of the entanglements between the fibrous conductive materials that are bonded to the respective conductive materials. In particular, as for a plurality of the conductive materials, it is desirable that they can be those which adhere onto a surface of a plurality of the active-material powders respectively. Specifically, it is desirable that at least a part of a plurality of said fibrous conductive materials can be disposed so as to span independently between said conductive materials that are adhered to each surface of a plurality of said active-material powders respectively. As a result, it is possible to connect electrically between the distinct active-material powders with the fibrous conductive materials.

Further, it is desirable to sinter between said active-material powder and said conductive material, and/or between said conductive material and said fibrous conductive materials, because that makes it possible to materialize a firm bond therebetween.

In particular, it is desirable that said fibrous conductive materials can contain at least one member that is selected from the group consisting of carbon fibers, graphite fibers, vapor-phase-growth carbonaceous fibers, nano carbon fibers and nano carbon tubes. Carbonaceous materials are stable physically, and chemically too, and are materials that are good in terms of electric conductivity; among them, the materials being named herein are good in terms of availability as well.

It is desirable that said fibrous conductive materials can exhibit a fibrous diameter of 5 nm-200 nm. Moreover, it is desirable that said fibrous conductive materials can exhibit a fibrous length of 100 nm-50 μm. And, it is desirable that a content of said fibrous conductive materials can be 1-10% by mass when a sum of a mass of said active-material powder and a mass of said conductive material is taken as the standard. Further, it is desirable that a specific surface area of said active-material powder, to whose surface said conductive material is adhered, can be 1 $m^2/g$ or more when being used for positive electrode; and can be 4 $m^2/g$ or more when being used for negative electrode.

And, a production process for electrode for secondary battery according to the present invention, which solves the aforementioned assignment, is characterized in that it possesses:

an adhering/bonding step of mixing a conduct ive material, which is formed of a carbonaceous material, with an active-material powder for positive electrode and fibrous conductive materials, forming them as a conductive-material-adhered active-material powder being in such a state that it is adhered to a surface of said active-material powder, and bonding them between said active-material powder and said fibrous conductive materials, thereby obtaining an electrode material; and a step of forming an electrode of said electrode material being obtained.

The electric connection between the fibrous conductive materials and the active-material powder is ensured by bonding the fibrous conductive materials to a surface of the active-material powder, at the adhering/bonding step, in addition to securely materializing the electric connection between the active-material powder and the conductive material by forming it in such a state that the conductive material is adhered to a surface of the active-material powder. The electric connection between a plurality of the active-material powders, and the electric connection between the active-material powders and an electricity collector come to be formed by means of the fibrous conductive materials.

And, it is desirable that said adhering/bonding step can be a step of mixing an active-material raw material, which generates an active-material powder by means of doing calcination, with a conductive-material raw material, which comprises a carbonaceous material that generates a conductive material by doing calcination, and then calcining them. Moreover, it is desirable that said adhering/bonding step can be a step of mixing said active-material powder with a conductive-material raw material, which comprises a carbonaceous material that generates a conductive material by doing calcination.

In particular, in a step of adhering said conductive material onto a surface of said active-material powder at said adhering/bonding step, and/or in a step of forming a chemical bond between said fibrous conductive materials and said conductive material, it is possible to materialize high durability by means of employing a step of sintering both of them at 1,500° C. or less in an inert atmosphere after mixing them, because it is possible to have a firm bond arisen between materials that are adhered or bonded to each other, respectively.

Further, it is desirable that said conductive material can beat least one that is selected from the group consisting of amorphous carbonaceous materials, turbostratic carbonaceous materials and activated carbon.

Moreover, a secondary battery according to the present invention, which solves the aforementioned assignment, is a secondary battery that possesses a positive electrode; a negative electrode; a separator being interposed between said positive electrode and said negative electrode; and a nonaqueous electrolyte; and is characterized in that:

said positive electrode is:

an electrode for secondary batter possessing an electrode material that has: an active-material powder for positive electrode; a conductive material being formed of a carbonaceous material, and being adhered to a surface of said active-material powder; and fibrous conductive materials being bonded to said conductive material; or an electrode for secondary battery that is produced by a production process for electrode for secondary battery, the production process possessing: an adhering/bonding step of mixing a conductive material, which is formed of a carbonaceous material, with an active-material powder for positive electrode and fibrous conductive materials, forming them as a conductive-material-adhered active-material powder being in such a state that it is adhered to a surface of said active-material powder, and bonding them between said active-material powder and said fibrous conductive materials, thereby obtaining an electrode material; and a step of forming an electrode of said electrode material being obtained.

It becomes feasible to provide a secondary battery with high durability by means of employing the electrode for secondary battery according the present invention, electrode which has high durability, in one of the electrodes.

EFFECT OF THE INVENTION

The electrode for secondary battery according to the present invention, and an electrode that is produced by the production process for the same possess the following operations and advantages, because they possess the aforementioned constructions. Specifically, in the electrode for secondary battery according to the present invention, it becomes feasible to collect electricity from a surface of the active-material powder effectively by employing the conductive material that is adhered to a surface of the active-material powder, and the fibrous conductive materials that are connected to that conductive material as members for securing conductivity between the active-material powders, and the conductivity between the active-material powder and an electricity collector in the case of employing electricity collectors. It becomes feasible to secure enough conductivity as a whole because of the following: the conductivity that comes from a surface of the active-material powder is secured since the conductive material is adhered to the surface of the active-material powder; not only the fibrous conductive materials, which are bonded to the fibrous conductive materials, secure the conductivity reliably, but also the fibrous conductive materials absorb strains that occur by means of expansions and contractions of the conductive material, namely, even if the fibrous conductive materials themselves are distorted when strains are applied to them, it is possible to maintain the contact between the fibrous conductive materials and the conductive material, and the contact between the fibrous conductive materials.

EXPLANATION ON REFERENCE NUMERALS

11: Active-material Powder;
12: Conductive Material;
13: Fibrous Conductive Material; and
14: Electricity Collector Best Mode for Carrying Out the Invention Regarding an electrode for secondary battery according to the present invention and a production process for the same, and regarding a secondary battery according to the present invention, the explanations will be hereinafter carried out in detail based on their embodying modes. In the following embodying modes, the explanations will be carried out based on a case where a lithium secondary battery is employed as the secondary battery. Note that, not to mention that the electrode for secondary battery according to the present invention can be natural ly applied to lithium secondary batteries; in addition to that, it is applicable to batteries in which the active materials that contribute to the battery reactions are used in such a state that they are pulverized.

(Electrode for Lithium Secondary Battery and Production Process for the Same)

An electrode for secondary battery according to the present embodying mode is for positive electrode; and possesses an electrode material, and the other members that are selected depending on needs. As for the other members, it is possible to name (1) electricity collectors that collect electricity from the electrode material, and (2) binding materials, which are materials that fulfill a role of fastening an active-material powder, a conductive material and fibrous conducive materials together between them respectively. As for the electricity collectors, it is possible to exemplify metallic thin films. For example, aluminum foils can be named as for the electricity collector of positive electrode.

The electrode material has an active-material powder for positive electrode, a conductive material and fibrous conductive materials, and the other materials that are selected depending on needs.

Except that the active-material powder is a powder, which is constituted of a material that is capable of storing and releasing lithium ions and can be employed for lithium secondary batteries, it is not limited especially. The particle diameter is not limited especially.

For the active-material powder that is employed for positive electrode (i.e., a positive-electrode active-material powder), it is possible to employ known positive-electrode active materials, such as lithium-transition metal composite oxides. Lithium-transition metal composite oxides are preferable materials as the active-material powder, because of the facts that their electric resistances are low, their diffusion performance for lithium ions is good and high charge/discharge efficiency and favorable charge/discharge cyclic characteristic are obtainable. For example, they are materials in which Li, Al or a transition metal, such as Cr, is added to each of lithium-cobalt oxides, lithium-nickel oxides, lithium-manganese oxides and lithium-iron phosphate compounds, or materials in which it substitutes for some of the elements of them, and the like. Note that, in the case of adapting these lithium-metal composite oxides into the positive-electrode active-material powder, it is also feasible to mix these composite oxides in a plurality of species to make use of them.

For reference, as for the active-material powder that is employed for negative electrode (i.e., a negative-electrode active-material powder), it is possible to exemplify carbonaceous materials, such as graphite and amorphous carbon, and alloy-system negative-electrode active materials. In particular, since it is possible to make the specific surface area larger by employing a carbonaceous material, it is possible to make the rates of storing and releasing lithium ions faster. As a result, the characteristic of charge/discharge with large current, and the output and regenerative densities become favorable. Among them, a carbonaceous material comprising natural graphite or artificial graphite whose crystallinity is high is more preferable. It is possible to improve the delivery/receipt efficiency of lithium ions at negative electrode by means of using such a carbonaceous material with high crystallinity.

The conductive material is one which comprises a carbonaceous material that is adhered to a surface of the active-material carbon. As for the carbonaceous material that constitutes the conductive material, those whose crystalline structure is turbostratic or amorphous are desirable. To be concrete, carbon black, acetylene black, and the like, can be named. Alternatively, it is also desirable to employ activated carbon whose amorphous part makes a part thereof.

The conductive material is adhered to a surface of the active-material powder. As for a method of the adhesion, it is desirable to carry it out with covalent bond or van der Waals force. To be concrete, it is possible to adhere the conductive material to a surface of the active-material powder by having a firm bond, such as covalent bond, arisen, or it is possible to adhere the conductive material to a surface of the active-material powder with van der Waals force by sticking them closely by means of the following (i.e., an adhering/bonding step): calcining an active-material raw material, which generates an active-material powder by doing calcination, along with a conductive material (or a conductive-material raw material, which generates a conductive material by doing calcination); or carrying out calcination in such a state that a conductive material is put into contact with a surface of an active-material powder and in an inert atmosphere. Here, as for the active-material raw material, it is possible to name compounds (i.e., lithium hydroxide, lithium carbonate, cobalt oxide, nickel oxide, iron oxide, lithium phosphate, and the like, for instance) that contain elements, which constitute positive-electrode active-material powers (lithium-metal composite oxides, and so forth) that are used in positive electrodes for secondary batteries. Moreover, as for the conductive-material raw material, it is possible to name materials like pitch or tar in a case of employing an amorphous carbonaceous material as the conductive material, namely, such a material as that includes a carbonaceous material whose crystalline structure differs from that of the conductive material, or such a material as that includes an element other than carbon and from which that element is volatilized by means of calcination.

As for conditions when employing calcination, it is desirable to carry it out at 1,500° C. or less in an inert atmosphere, it is further desirable to carry it out at 1,300° C. or less. For positive electrode, it is more desirable to set it to 600° C. or less. As for the inert gas atmosphere, an atmosphere being filled up with a rare gas, such as argon, or with nitrogen, or the like; or a vacuum atmosphere can be exemplified. Calcining conditions in the sequel to the following bonding step can also be selected similarly.

Before forming a bond by means of calcination, and the like, it is desirable to mix the active-material powder (and/or active-material raw material) with the conductive material (and/or conductive-material raw material) as uniformly as possible. As for a mixing method, it is desirable to carry out the mixing by utilizing a pulverizing operation by means of ball mill, and the like, though not being limited so especially.

It is desirable to contain the conductive material in an amount of 1% by mass-10% by mass approximately when a mass of the active-material powder is taken as the standard, and it is more desirable to contain it in an amount of 3% by mass-8% by mass approximately.

A specific surface area of the active-material powder to whose surface the conductive material is adhered can desirably be 1 $m^2/g$ or more. Here, the specific surface area is a value that is measured with a BET method using nitrogen.

The fibrous conductive materials are a member, which has a fibrous form that is constituted of a material possessing conductivity. For example, they can be constituted of carbonaceous materials, metals or conductive ceramics, and can desirably be constituted of a carbonaceous material. To be concrete, it can desirably contain at least one member that is selected from the group consisting of carbon fibers, graphite fibers, vapor-phase-growth carbonaceous fibers, nano carbon fibers and nano carbon tubes. As for a fibrous diameter of the fibrous conductive materials, it can desirably be 5 nm-200 nm, and it can more desirably be 20 nm-100 nm. Moreover, a fibrous length of the fibrous conductive materials can desirably be 100 nm-50 μm, and it can more desirably be 1 μm to 30 μm. And, an aspect ratio (i.e., "fibrous length" ÷ "fibrous diameter") of the fibrous conductive materials can desirably be from more than 0.5 to less than 800, can more desirably be 5-40, and can much more desirably be 10-30. In particular, it can be 20 approximately.

The fibrous conductive materials can desirably be contained in a range of from 1-10% by mass when a sum of a mass of the active-material powder and a mass of the conductive material is taken as the standard, and can more desirably be contained in a range of 2-6% by mass.

It is possible to bond the fibrous conductive materials to the conductive material by carrying out calcination, and the like, in such a state that they are mixed with the active-material powder to whose surface the conductive material is adhered (or conductive-material-adhered active-material powder) (i.e., an adhering/bonding step). Moreover, depending on conditions, it is also feasible to bond the fibrous conductive materials to the conductive material by simultaneously making the fibrous materials contain in the step of adhering the conductive material onto a surface of the active-material powder.

The binding material is a stable material that is stable physically and chemically in the atmosphere within battery; and it is possible to use the following for it : fluorine-containing resins, such as polytetrafluoroethylene, polyvinylidene fluoride and fluoro rubber, and thermoplastic resins, such as polypropylene and polyethylene.

The electrode material is applied to batteries in such a state that it is dispersed or dissolved in an appropriate solvent (e.g., an organic solvent, such as N-methyl-2-pyrolidone, or a water-based solvent, such as water) to turn it into a paste, and then in such a state that it is turned into a thin film that is formed by applying it onto and then drying on a surface of appropriate flat plate or electricity collector. It is also feasible to bond between the fibrous conductive materials by carrying out calcination in a state of being turned into a thin film. The active-material powder that is included in the electrode material makes an electric contact by means of the mutually entangled fibrous conductive materials, which are bonded to each element of the active-material powder by way of the conductive material (being connected electrically between itself and the active-material powder because it is adhered to a surface of the active-material powder).

(Lithium Secondary Battery)

A lithium secondary battery according to the present embodying mode possesses a positive electrode, a negative electrode, a separator, a nonaqueous electrolyte, and the other battery members that are selected depending on needs. For the positive electrode, the electrode for lithium secondary battery according to the present embodying mode is employed.

The negative electrode, that is, the electrode in which the electrode for lithium secondary battery according to the present embodying mode is not employed, is not limited in particular.

The separator is a porous thin-film-shaped member that is set between the positive electrode and the negative electrode. For example, it is possible to name a porous film that is constituted of a material, such as polyolefine like polypropylene or polyethylene, which is stable within battery.

As for the nonaqueous solution, it is possible to name those in which a supporting salt is dissolved in or solidified with a certain liquid or solid that makes a medium, or materials (ion-conductive polymers, and the like) that possess of themselves ion conductivity; and it is possible to exemplify those in liquid form or solid form. When employing a solid-formed nonaqueous electrolyte, it is possible to think of such a case that the above-described separator can be omitted. As for the supporting salt, it is possible to exemplify lithium salts, such as $LiPF_6$, $LiBF_4$ and $LiF$. Regarding a concentration of the supporting salt as well, it is preferable to select it appropriately depending on applications and taking the types of supporting salt and organic solvent into consideration, though not being limited so especially. As for the medium, it is possible to use organic solvents, such as carbonates, halogenated hydrocarbons, ethers, ketones, nitriles, lactones, oxolane compounds, for instance. In particular, the following can be proper: polypropylene carbonate, ethylene carbonate, 1,2-dimethoxyethane, dimethyl carbonate, diethyl carbonate, ethyl methyl carbonate, vinylene carbonate, and the like, and mixture solvents of these.

As for the other battery members, it is possible to name electrode terminals of each of the positive and negative electrodes, electrode terminals which are connected to each of the positive and negative electrodes electrically, and battery cases that accommodate these constituent elements within the inside.

EXAMPLES

Hereinafter, a lithium secondary battery according to the present invention will be explained by means of examples and comparative examples. However, the present invention shall not be limited to the following examples as far as not going beyond its gist. Electrodes, and a battery manufacturing method, in the present invention will specified below. In the respective examples, the following positive electrodes, negative electrodes and separator were put together to make prototype batteries.

Example No. 1

(Positive Electrode)

A positive-electrode electrode material, which is coated with a conductive material (resulting from carbon black) and to which fibrous conductive materials (resulting from carbon fibers) were bonded, was produced by mixing lithium hydroxide, cobalt oxide, lithium carbonate, carbon black and carbon fibers and then calcining them. That is, an adhering step of adhering the conductive material onto a surface of the active-material powders, and a bonding step of bonding the fibrous conductive materials to that conductive material were carried out by means of this calcination.

An addition amount of the carbon black was set at such an amount that included the conductive material in an amount of 7.5% by mass when the after-production active-material powders (i.e., lithium cobaltate) were taken as the standard. As for the addition amount of the carbon fibers, they were added so that they made 3 by mass when a mass of the entire electrode material was taken as 92 parts by mass. A specific surface area of the produced electrode material was 0.5-0.8 $m^2/g$.

And, a positive-electrode mixture agent (i.e., a slurry) was manufactured by adding polyvinylidene fluoride serving as a binding material in an amount of 5 parts by mass, adding N-methylpyrrolidone serving as a dispersion solvent to this, and then kneading them. The manufactured slurry was applied onto the both opposite surfaces of an electricity collector that comprised an aluminum foil with 20-μm thickness, and was then dried; and thereafter the electricity collector was pressed, and was cut to a predetermined length; thereby obtaining a positive electrode (i.e., an electrode for secondary battery) that comprised the aluminum foil, and whose thickness was about 150 μm.

(Negative Electrode)

A negative-electrode electrode material, which is coated with a conductive material (resulting from amorphous carbon: pitch and tar) and to which fibrous conductive materials (resulting from carbon fibers) were bonded, was produced by mixing a graphite powder, pitch, tar and carbon fibers and then calcining them. That is, an adhering step of adhering the conductive material onto a surface of the active-material powders (i.e., graphite), and a bonding step of bonding the fibrous conductive materials to that conductive material were carried out by means of this calcination.

As for the addition amount of the carbon fibers, they were added so that they made 1 by mass when a mass of the entire electrode material was taken as 93 parts by mass. A specific surface area of the produced electrode material was 4 $m^2/g$ or less.

And, a slurry was manufactured by adding polyvinylidene fluoride serving as a binding material in an amount of 6 parts by mass, adding N-methylpyrrolidone serving as a dispersion solvent to this, and then kneading them. A negative electrode that comprised a copper foil with 10-μm thickness, and whose thickness was about 140 μm was obtained by mean of pressing the copper foil and then cutting it to a predetermined length after applying the manufactured slurry onto the both opposite surfaces of the copper foil and then drying it.

And, the carbon fibers that were used for the aforementioned positive and negative electrodes were those whose diameter was 100 nm and length was 5 μm. And, the calcination temperature at the time of bonding was 600° C., and the calcination atmosphere was a nitrogen atmosphere. As for the calcination temperature, it was possible to materialize the calcination in such a state that the decompositions were minimized by setting it at this temperature or less. It is necessary to select the selection of the calcination temperature depending on positive and negative electrode materials that are to be made use of, namely: 600° C., or less for the positive electrode; and 1,300° C. or less for the negative electrode.

The positive and negative electrodes, which were manufactured as aforementioned, were wound around to each other by way of a separator, which was made of polyethylene and whose thickness was 20 μm, thereby adapting them into an electrode assembly; this electrode assembly was inserted into a cylinder-shaped battery container; and then it was sealed by means of crimping at the opening with a top lid after pouring an electrolyte into it in a predetermined amount, thereby obtaining a cylinder-shaped lithium-ion secondary battery, a testing battery according to the present testing example.

For the electrolyte, one in which lithium phosphate hexafluoride ($LiPF_6$) was dissolved into a solution, in which ethyl carbonate (EC) and methyl ethyl carbonate (MEC) were mixed in a volumetric ratio of 30:70, in an amount of 1 mol/liter was used. A designed capacity of this battery was 1,000 mAh.

Testing Example No. 2

A prototype cylinder-shaped lithium-ion battery with the same specifications as those of Testing Example No. 1 was made using the following, and was then labeled as a testing battery according to the present testing example: lithium cobaltate that was coated with carbon black, and whose specific surface area was 1 $m^2$/g or more, namely, a positive electrode that was produced in the same manner as Testing Example No. 1; particulates that were coated with amorphous carbon, and whose specific surface area was 4 $m^2$/g or more, namely, a negative electrode that was produced in the same manner as Testing Example No. 1; and those in which carbon fibers were bonded chemically to each of them as the fibrous conductive materials by the same calcining method as that of Testing Example No. 1.

Testing Example Nos. 3-12

Hereinafter, testing batteries having the constructions that are given in Table 1 and Table 2 were manufactured, and were then labeled as testing batteries according to the respective testing examples.

TABLE 1

| | | Positive Electrode | | | | |
|---|---|---|---|---|---|---|
| | | Specific Surface Area of Coated Positive Electrode Active Material | Fibrous Conductive Materials | | | |
| | Coating by Conductive Material | | Mixing Amount | With or Without Calcining Operation | Fibrous Diameter | Fibrous Length |
| Testing Example No. 1 | Present | 0.5-0.8 $m^2$/g | 3 Parts by Mass | Done | 100 nm | 5 μm |
| Testing Example No. 2 | Present | 1 $m^2$/g or more | 3 | Done | 100 nm | 5 μm |
| Testing Example No. 3 | Present | 1 $m^2$/g or less | — | — | — | — |
| Testing Example No. 4 | Present | 1 $m^2$/g or less | 3 | Done | 3 nm | 5 μm |
| Testing Example No. 5 | Present | 1 $m^2$/g or less | 3 | Done | 500 nm | 5 μm |
| Testing Example No. 6 | Present | 1 $m^2$/g or less | 3 | Done | 100 nm | 50 nm |
| Testing Example No. 7 | Present | 1 $m^2$/g or less | 3 | Done | 100 nm | 80 μm |
| Testing Example No. 8 | Present | 1 $m^2$/g or less | 0.5 | Done | 100 nm | 5 μm |
| Testing Example No. 9 | Present | 1 $m^2$/g or less | 12 | Done | 100 nm | 5 μm |
| Testing Example No. 10 | Present | 1 $m^2$/g or less | 3 | None | 100 nm | 5 μm |
| Testing Example No. 11 | Absent | 1 $m^2$/g or less | 3 | Done | 100 nm | 5 μm |
| Testing Example No. 12 | Absent (but Carbon-black Mixing Done) | 1 $m^2$/g or less | 3 | Done | 100 nm | 5 μm |

TABLE 2

| | Coating by Conductive Material | Specific Surface Area of Coated Negative Electrode Active Material | Fibrous Conductive Materials | | | |
|---|---|---|---|---|---|---|
| | | | Mixing Amount | With or Without Calcining Operation | Fibrous Diameter | Fibrous Length |
| Testing Example No. 1 | Present | 4 m$^2$/g or less | 1 Part by Mass | Done | 100 nm | 5 μm |
| Testing Example No. 2 | Present | 4 m$^2$/g or more | 1 | Done | 100 nm | 5 μm |
| Testing Example No. 3 | Present | 4 m$^2$/g or less | — | — | — | — |
| Testing Example No. 4 | Present | 4 m$^2$/g or less | 1 | Done | 3 nm | 5 μm |
| Testing Example No. 5 | Present | 4 m$^2$/g or less | 1 | Done | 500 nm | 5 μm |
| Testing Example No. 6 | Present | 4 m$^2$/g or less | 1 | Done | 100 nm | 50 nm |
| Testing Example No. 7 | Present | 4 m$^2$/g or less | 1 | Done | 100 nm | 80 μm |
| Testing Example No. 8 | Present | 4 m$^2$/g or less | 0.5 | Done | 100 nm | 5 μm |
| Testing Example No. 9 | Present | 4 m$^2$/g or less | 12 | Done | 100 nm | 5 μm |
| Testing Example No. 10 | Present | 4 m$^2$/g or less | 1 | None | 100 nm | 5 μm |
| Testing Example No. 11 | Absent | 4 m$^2$/g or less | 1 | Done | 100 nm | 5 μm |
| Testing Example No. 12 | Absent (but Amorphous-carbon Mixing Done) | 4 m$^2$/g or less | 1 | Done | 100 nm | 5 μm |

Regarding each of the thus produced testing batteries according to the respective testing examples, a charge/discharge test was performed, and then their large-current load capacity characteristics, and their cyclic life performances were compared.

In the measurement of the large-current load capacity characteristics, the batteries in 4.2-V charged state were first of all discharged down to 2.75 V, a terminal voltage, with a current of 1 hour rate (1 C), and their discharge capacities were found from the products of their current values and times.

Next, the same batteries were subjected to a constant current-constant voltage charging under an upper-limit voltage of 4.2 V. After the charging, they were discharged down to 2.75 V with a current of $^1\!/_{10}$ hour rate (10 C) to found their discharge capacities, and then their 10 C-capacity/1 C-capacity ratios were compared.

On the other hand, in the cyclic life test, the following cycle was repeated at an ambient temperature of 60° C.±2° C.: subjecting them to a constant current-constant voltage charging under an upper-limit voltage of 4.2 V with ½ hour rate (2 C); and then discharging them with ½ hour rate (2 C) down to a terminal voltage of 3.0 V.

And, it was judged that the number of cycles at which they exhibited the 80%-capacity maintenance rate of their initial capacities were regarded as their longevities. This test was done under severe conditions compared with those of a cyclic-life battery test for cellular phone or notebook-size personal computer for consumer application in which the following cycle is repeated at an ambient temperature of 25° C.±2° C.: subjecting it to a constant current-constant voltage charging under an upper-limit voltage of 4.2 V with 1 hour rate (1 C); and then discharging it with 1 hour rate (1 C) down to a terminal voltage of 3.0 V; and it was one which was intended to be served as a test, which made it feasible to provide batteries that withstood long-term large-current charging/discharging, because those with the above-described consumer-application battery specifications had come to reach their longevities at their early stages. The results are given in Table 3.

TABLE 3

| | Discharge Capacity Proportion (10 C/1 C) | Cyclic Life |
|---|---|---|
| Testing Example No. 1 | 80% | 500-600 |
| Testing Example No. 2 | 98% | 600- |
| Testing Example No. 3 | 10% or less | -100 |
| Testing Example No. 4 | 43% | 300-350 |
| Testing Example No. 5 | 67% | 400-450 |
| Testing Example No. 6 | 47% | 250-300 |
| Testing Example No. 7 | 64% | 450-500 |
| Testing Example No. 8 | 10% or less | -100 |
| Testing Example No. 9 | 28% | 450-500 |
| Testing Example No. 10 | 33% | 250-300 |
| Testing Example No. 11 | 56% | 500-600 |
| Testing Example No. 12 | 21% | -100 |

As it is apparent from Table 3, it was understood that the testing batteries according to Testing Example Nos. 1, 2, 4-7 and 9, which possessed the electrodes for secondary battery that had the conductive material being adhered to a surface of the active-electrode powders, and that had the fibrous conductive materials being bonded to that conductive material, were good in terms of their cyclic lives, compared with the testing battery according to Testing Example No. 3 (i.e., no fibrous conductive materials) as well as Testing Example No. 10 (i.e., in which the fibrous conductive materials were not bonded) that lacked one of those constituent elements, and compared with the testing battery according to Testing Example No. 8 (i.e., in which the content of the fibrous conductive materials was 0.5 parts by mass) that did not contain the fibrous conductive materials, one of those constituent elements, sufficiently.

Note that, in the testing battery according to Testing Example No. 11, no conductive material was adhered to a surface of the active-material powders; however, it is possible to assume that the stress relaxation action, which resulted from the fibrous conductive materials, was demonstrated because the fibrous conductive materials were bonded to a surface of the active-material powders to a certain extent by carrying out the sintering operation in such a state that the fibrous conductive materials were mixed. This is also apparent from the result on the cyclic life of Testing Example No. 10 that possessed the fibrous conductive materials which are believed to have not been in a bonded state, because no sintering operation was carried out. That is, from the result on the testing battery according to Testing Example No. 11, it was understood that it is desirable not only to simply mix the fibrous conductive materials but also to have them being bonded by means of sintering, and the like.

Here, the cyclic characteristic of the testing battery according to Testing Example No. 6 that had the bonded fibrous conductive materials did not make much difference from the cyclic life of the testing battery according to Example No. 10 that did not had any bonded fibrous conductive materials; this is believed to result from the following: in the testing battery according to Testing Example No. 10, the fibrous conductive materials had such a short fibrous length as 50 nm, compared with the 100-nm fibrous diameter, so that they could not demonstrate the action of absorbing occurred strains sufficiently. Since the testing battery according to Example No. 10 contained the fibrous conductive materials sufficiently though the fibrous conductive materials were not bonded to the conductive material, it is believed that they could demonstrate the stress relaxation action to a certain extent.

And, among these testing batteries that were good in terms of the cyclic life, the testing batteries according to Testing Example Nos. 1, 2 and 11 exhibited high cyclic lives favorably. In particular, the cyclic life of the testing battery according to Testing Example No. 2 was excellent. From this, the following became apparent: it is desirable that the fibrous conductive materials can be bonded by means of sintering; and, as for the fibrous conductive materials, ranges that involve the fibrous diameter being 100 nm and the fibrous length being 5 μm are superb. Moreover, since the testing battery according to Testing Example No. 2 was especially good, it was understood that it is desirable that the specific surface area of the coated positive-electrode active-material powder can be 1 $m^2/g$ or more, and that it is desirable that the specific surface area of the coated negative-electrode active-material powder can be 4 $m^2/g$ or more.

And, it is believed that the testing battery according to Example No. 1 exhibited a good cyclic life, because, in the testing battery according to Testing Example No. 7, the fibrous length of the fibrous conductive materials had such a long fibrous length as 80 μm so that the number of the fibrous conductive materials that were bonded to the conductive material became less relatively, and eventually because the stress relaxation action became low compared with that of the testing battery according to Testing Example No. 1.

Moreover, because of the fact that the addition amount of the fibrous conductive materials was so great as 12 parts by mass in the testing battery according to Testing Example No. 9, no sufficient stress relaxation action could be demonstrated adversely, and accordingly it is believed that the testing battery according to Testing Example No. 1 exhibited a better cyclic life than did the former.

Further, from the results on the testing battery according to Testing Example No. 5 with the thick fibrous diameter (e.g., 500 nm), and from the results on the testing battery according to Testing Example No. 4 with the fine fibrous diameter (e.g., 3 nm), it was understood that the testing battery according to Testing Example No. 1 with the fibrous length that are believed to fall within the appropriate range exhibited a better cyclic life than did the formers.

Moreover, although not only the mixing of the fibrous conductive materials but also the sintering operation were carried out in the testing battery according to Testing Example No. 12, it is assumed that, since it was not possible to adhere the conductive material, which was a mating member to which the fibrous conductive materials are bonded, onto a surface of the active-material powders under the conditions according to Testing Example No. 12 and thereby the fibrous conductive materials, which existed in independent states, had become more, the cyclic life could not exhibit a sufficient value, either. This can be supported from the results on the testing battery according to Testing Example No. 11. Specifically, it is because the testing battery according to Testing Example No. 11 in which the sintering operation was carried out without adding the conductive material and therefore the fibrous conductive materials were bonded to a surface of the active-material powders exhibited a high cyclic life, compared with that of the testing battery according to Testing Example No. 12 in which the fibrous conductive materials were added in such a state that the conductive material was added in a free state and then the sintering operation was carried out.

And, from the results on the discharge capacity proportion, it was understood that the testing batteries according to Testing Example Nos. 1, 2, 5 and 7 exhibited high capacity proportions (i.e., 60% or more). In particular, it was understood that the testing battery according to Testing Example No. 2 exhibited high performances in both of the capacity proportion and cyclic life, because the loads, which were applied to the active-material powders per the unit surface area, became smaller at the time of large-current charging/discharging, and further because the reactive resistance of the active materials became much smaller so that it was possible to suppress the occurrence of strains.

And, the testing batteries according to Testing Example Nos. 3 and 12 could not exhibit any sufficient capacity proportions. This is believed to result from the following: no sufficient conductive networks could be formed so that the internal resistance had become larger, because no fibrous conductive materials were included in the testing battery according to Testing Example No. 3. Moreover, it is believed to result from the fact that the internal resistance had increased, because the conductive material was not adhered to a surface of the active-material powders in the testing battery according to Testing Example No. 12.

And, from the results on Testing Example No. 4, it became apparent that ranges involving 50 nm are desirable as for the fibrous diameter. This is believed to be due to the following: the fibrous conductive materials could not be dispersed well upon mixing and then dispersing the conductive fibers before bonding them by calcination, because of the intermolecular forces between them so that they had been nonuniform; and accordingly unevenness has occurred.

Moreover, from the results on Testing Example No. 6, it became apparent that ranges involving 5 μm are desirable as for the fibrous length. It is believed to be as follows: when the fibrous length of the fibrous conductive materials is short, the entanglements between the fibrous conductive materials become less and thereby the liquid holding property for electrolyte has become poor and then the internal resistance of battery has augmented.

From the results on Testing Example Nos. 8 and 9, it became apparent that, as for the mixing amount of the fibrous conductive materials, ranges involving 3 parts by mass (for the positive electrode), and ranges involving 1 part by mass (for the negative electrodes) are desirable. The fibrous conductive materials can form sufficient conductive networks by having them contained to a certain extent, and additionally setting the content to a predetermined amount or less increases a relative content of the active-material powders so that it is feasible to raise capacity.

From the results on Testing Example No. 10, it was understood that the internal resistance became smaller by carrying out the calcining operation and then the capacity proportion became larger. From the results on Testing Example No. 11, it was understood that it is extremely good to adapt the conductive material into such a state that it is adhered to a surface of the active-material powders.

Note that, as the results of the present test, 70% or more is desirable for the discharge capacity proportion, and that 500 cycles or more are desirable for the cyclic life. As for a testing battery that satisfies both of them, the testing batteries according to Testing Example Nos. 1 and 2 can be named.

Moreover, although not being set forth in detail, it is understood that the heat conductivity is improved by means of bonding the fibrous conductive materials to the active-material powders directly at the contacts between them. The fibrous conductive materials that were dispersed homogenously within the electrodes resulted in demonstrating an effect for the prevention of heat generation in battery, too, as a consequence. In particular, the heat generations in the testing batteries according to Testing Example Nos. 1 and 2 at the time of 10 C discharging were less, compared with the heat generations in comparative examples.

It is not possible to say that the fibrous conductive materials suppressed the heat generations, but this is rather believed that the formed electric-conductive networks acted as heat-conductive networks that were good in terms of heat conductivity as well so that they dissipated and then emitted heat efficiently.

Further, as an effect of manufacturing secondary batteries using the electrode for secondary battery according to the present invention, it became feasible to intend the increase of specific surface area and the improvement of wettability by having the fibrous conductive materials being contained with good dispersibility so that the liquid absorbing property and liquid holding property for electrolyte were improved, and consequently an effect of shortening the time for filling up the electrolyte was observed. And moreover, regarding the testing batteries after being subjected to the cycles, no depletion of the electrolyte occurred so that the electrolyte was present in the electrodes sufficiently.

Although no results are specified especially, the above-described effects were demonstrated remarkably in cases where carbon nanotubes and carbon nanofibers were employed. Since nano carbon exhibits large elasticity, it is not only flexible but also good in terms of bending characteristic, and therefore it is believed that it shall work significantly against the phenomenon that it expands and contracts as an electrode plate during the cycles.

The invention claimed is:

1. An electrode for secondary battery, wherein the electrode includes an electrode material having:
    an active-material powder for positive electrode;
    a conductive material being formed of a carbonaceous material, and being adhered to a surface of said active-material powder; and
    fibrous conductive materials being bonded to said active-material powder and said conductive material;
    wherein a specific surface area of said active-material powder, to whose surface said conductive material is adhered, is 1 $m^2/g$ or more; and
    wherein said conductive material has at least one covalent bond with said active material powder, and/or with said fibrous conductive materials.

2. The electrode for secondary battery as set forth in claim 1, wherein said conductive material is at least one that is selected from the group consisting of amorphous carbonaceous materials, turbostratic carbonaceous materials and activated carbon.

3. The electrode for secondary battery as set forth in claim 1, wherein at least a part of said fibrous conductive materials are bonded to a plurality of said conductive materials.

4. The electrode for secondary battery as set forth in claim 3, wherein the at least a part of said fibrous conductive materials are disposed so as to span independently between a first conductive material adhered to a surface of a first active-material powder and a second conductive material adhered to a surface of a second active-material powder.

5. The electrode for secondary battery as set forth in claim 1, wherein said fibrous conductive materials contain at least one member that is selected from the group consisting of carbon fibers, graphite fibers, vapor-phase-growth carbonaceous fibers, nano carbon fibers and nano carbon tubes.

6. The electrode for secondary battery as set forth in claim 1, wherein said fibrous conductive materials exhibit a fibrous diameter of 5 nm-200 nm.

7. The electrode for secondary battery as set forth in claim 1, wherein said fibrous conductive materials exhibit a fibrous length of 100 nm-50 μm.

8. The electrode for secondary battery as set forth in claim 1, wherein a content of said fibrous conductive materials is 1-10% by mass when a sum of a mass of said active-material powder and a mass of said conductive material is taken as the standard.

9. A production process for electrode for secondary battery, wherein the production process includes:
    an adhering/bonding step of mixing a conductive material, which is formed of a carbonaceous material, with an active-material powder for positive electrode and fibrous conductive materials, forming the mixture as a conductive-material-adhered active-material powder being in such a state that it is adhered to a surface of said active-material powder, and bonding the mixture between said active-material powder and said fibrous conductive materials, thereby obtaining an electrode material; and a step of forming an electrode of said electrode material being obtained;

wherein a specific surface area of said active-material powder, to whose surface said conductive material is adhered, is 1 m$^2$/g or more; and wherein said conductive material has at least one covalent bond with said active material powder, and/or with said fibrous conductive materials.

10. The production process for electrode for secondary battery as set forth in claim 9, wherein said adhering/bonding step is a step of mixing an active-material raw material, which generates an active-material powder by means of doing calcination, with a conductive-material raw material, which comprises a carbonaceous material that generates a conductive material by doing calcination, and then calcining them.

11. The production process for electrode for secondary battery as set forth in claim 9, wherein said adhering/bonding step is a step of mixing said active-material powder with a conductive-material raw material, which comprises a carbonaceous material that generates a conductive material by doing calcination.

12. The production process for electrode for secondary battery as set forth in claim 9, wherein a step of adhering/bonding said conductive material onto a surface of said active-material powder at said adhering step, and/or a step of forming a chemical bond between said fibrous conductive materials and said conductive material is a step of calcining both of them at 1,500° C. or less in an inert atmosphere after mixing them.

13. The production process for electrode for secondary battery as set forth in claim 9, wherein said conductive material is at least one that is selected from the group consisting of amorphous carbonaceous materials, turbostratic carbonaceous materials and activated carbon.

14. A secondary battery including: a positive electrode; a negative electrode; a separator being interposed between said positive electrode and said negative electrode; and a nonaqueous electrolyte;

wherein said positive electrode is:

an electrode for secondary battery, the electrode including an electrode material that has: an active-material powder for positive electrode; a conductive material being formed of a carbonaceous material, and being adhered to a surface of said active-material powder; and fibrous conductive materials being bonded to said conductive material; or an electrode for secondary battery, the electrode being produced by a production process for electrode for secondary battery, the production process including: an adhering/bonding step of mixing a conductive material, which is formed of a carbonaceous material, with an active-material powder for positive electrode and fibrous conductive materials, forming the mixture as a conductive-material-adhered active-material powder being in such a state that it is adhered to a surface of said active-material powder, and bonding the mixture between said active-material powder and said fibrous conductive materials, thereby obtaining an electrode material; and a step of forming an electrode of said electrode material being obtained; and wherein a specific surface area of said active-material powder, to whose surface said conductive material is adhered, is 1 m$^2$/g or more; and wherein said conductive material has at least one covalent bond with said active material powder, and/or said conductive material and with said fibrous conductive materials.

* * * * *